Figure 4:
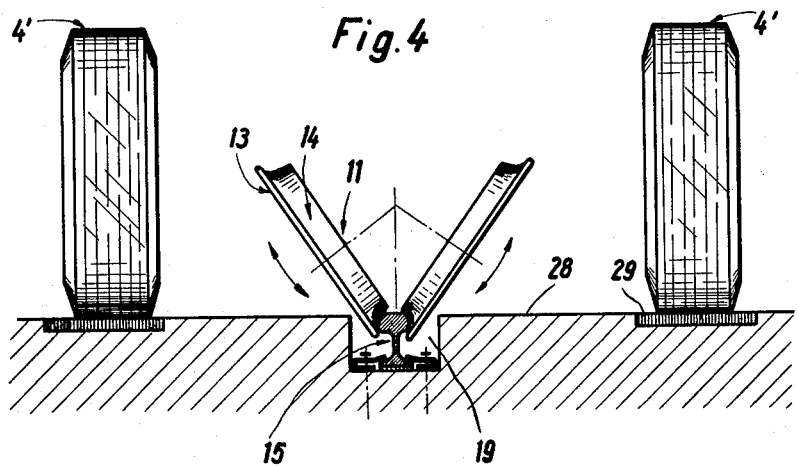

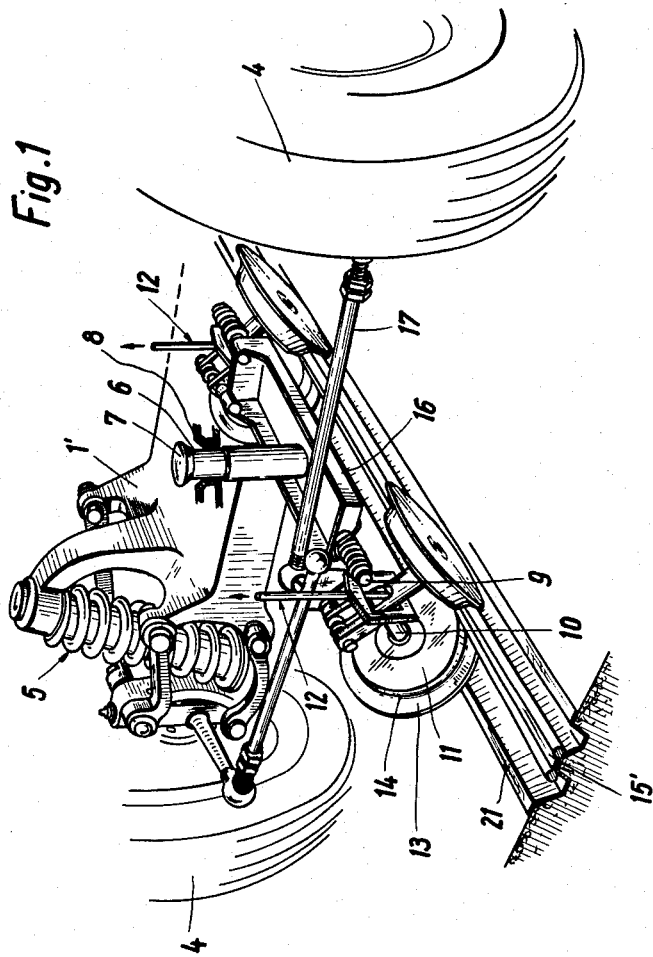

April 27, 1965  H. KUCH ETAL  3,180,280
VEHICLE AND GUIDE RAIL THEREFOR
Filed Aug. 28, 1963  4 Sheets-Sheet 2
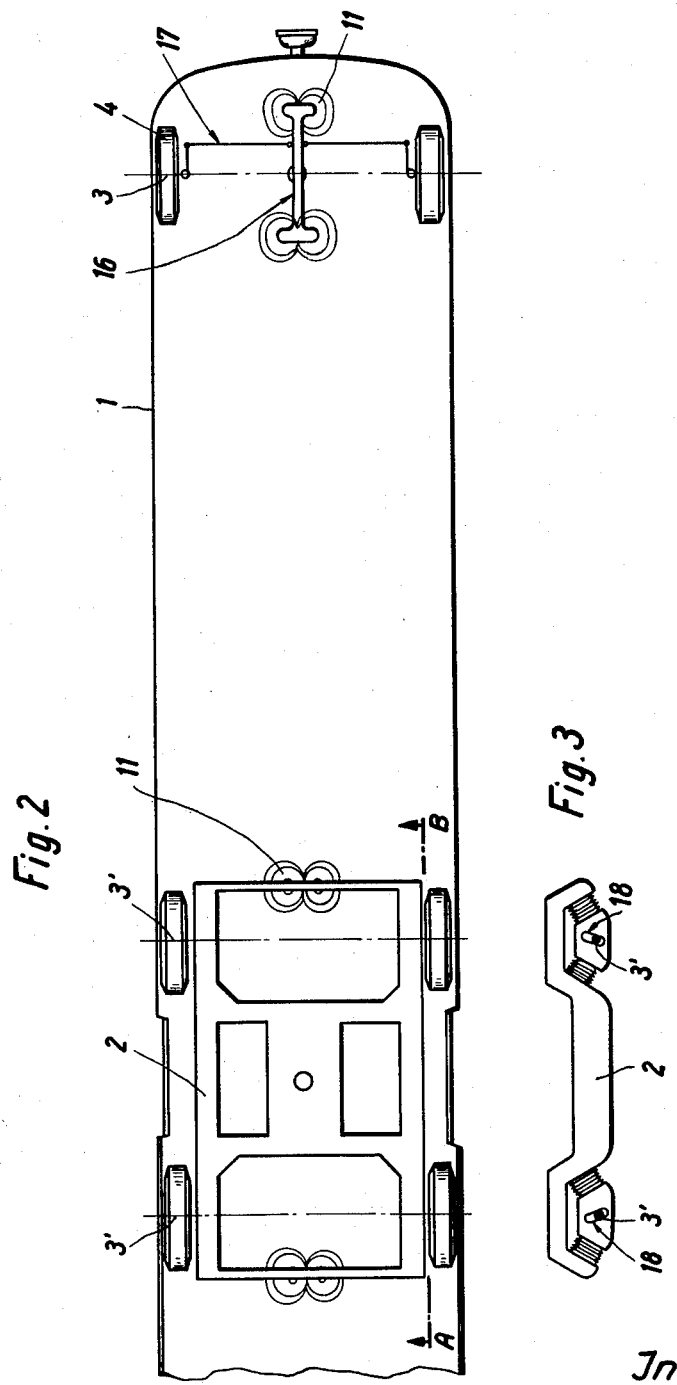
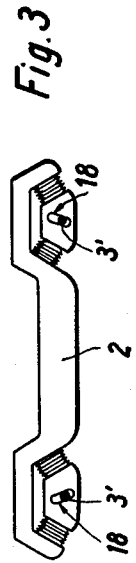
Inventors:
HEINER KUCH AND
HEINRICH JACOBI
BY Robert H. Jacobi
AGT.

April 27, 1965   H. KUCH ETAL   3,180,280
VEHICLE AND GUIDE RAIL THEREFOR
Filed Aug. 28, 1963   4 Sheets-Sheet 3

Inventors:
HEINER KUCH AND
HEINRICH JACOBI
BY
AGT.

April 27, 1965 H. KUCH ETAL 3,180,280
VEHICLE AND GUIDE RAIL THEREFOR
Filed Aug. 28, 1963 4 Sheets-Sheet 4

Inventors:
HEINER KUCH AND
HEINRICH JACOBI
BY Robert K Jacob
AGT.

United States Patent Office 3,180,280
Patented Apr. 27, 1965

3,180,280
VEHICLE AND GUIDE RAIL THEREFOR
Heiner Kuch, Neutorzwinger 3, and Heinrich Jacobi, Nornenstrasse 28, both of Nurnberg, Germany
Filed Aug. 28, 1963, Ser. No. 305,068
10 Claims. (Cl. 104—245)

The invention relates to train or railroad vehicles and is particularly concerned with a vehicle which is automatically steered by means of a center guide rail as well as to the construction of the guide rail for such a vehicle.

Vehicles provided with guide rollers are known where the rollers are pivotable about vertically disposed axes by way of levers and engage a center guiding means, for example a concrete block or track. This arrangement is structurally rather cumbersome and above all does not provide any secure support for the guiding mechanism in vertical direction. The guide rollers can swing down too far and touch the ground as well as also slide off the concrete guide track at the top. In both cases there is the immediate danger of the derailment of the train. Accordingly, such a vehicle is not safe in operation. In addition, with such guide rollers and a conducting means provided above the street or traveling surfaces, the construction and arrangement of switches as well as the transverse traffic of other vehicles becomes difficult or even impossible.

Contrary to the foregoing arrangement, the invention provides that the oppositely disposed guide rollers are always disposed obliquely, i.e. they define an acute angle relative to the horizontal and the guide rail is designed as a profile track or as a rail having a head portion extending laterally of both sides of the rail so that in the position of operation the profiled guide rollers encompass the guide rail in such a manner that the vertical displacement of the guide rollers is prevented.

In accordance with a preferred embodiment of the invention, the guide rollers have flanges which not only reach below the profile of the guide rail, but also rest on running surfaces of the guide rail. Besides, the guide rollers can be pivotably moved inwardly and outwardly about an axis extending in the direction of travel.

This arrangement has a number of advantages. In the first place, it is structurally very simple and at the same time sturdy as well as relatively trouble-free. Above all, any unintentional raising of the guide rollers upwardly as well as lowering them downwardly is prevented. The guiding mechanism is always in the correct position as far as the level is concerned so that individual running axles with supporting wheels as well as entire truck frames and, consequently, the entire vehicle can be guided along the guide rail while protection against derailment is insured.

Furthermore, the invention provides for vertical tolerance or play between the guiding means and the actual vehicle. Thus, the guide rail needs to carry only the relatively small weight of the guiding means while the total load of the vehicle is carried solely by the drive or running wheels. Thus, the rail or track may be constructed and arranged in such a manner that its greatest rigidness is provided in horizontal direction, i.e. the guiding or lateral forces that are effected in that direction are absorbed with safety.

The construction and placing of the guide rail, including the switches, is likewise very simple and therefore involves only relatively small costs.

Figure 5:
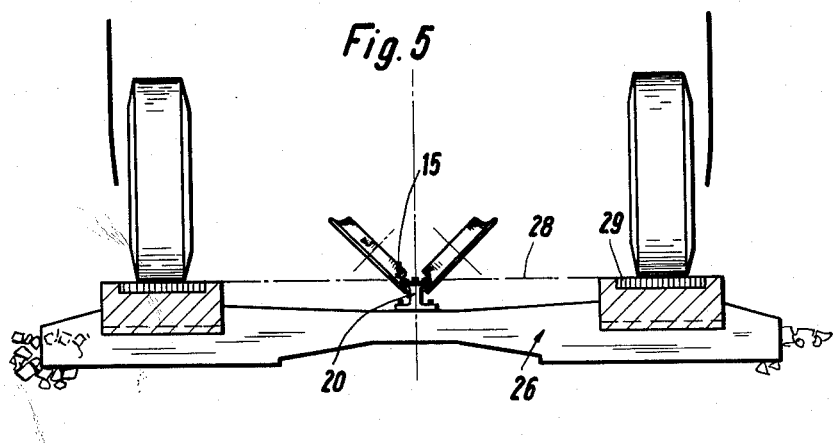
Figure 6:
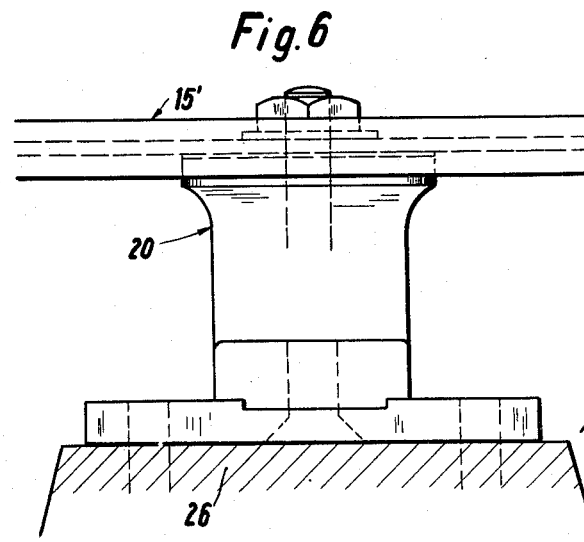
Figure 7:
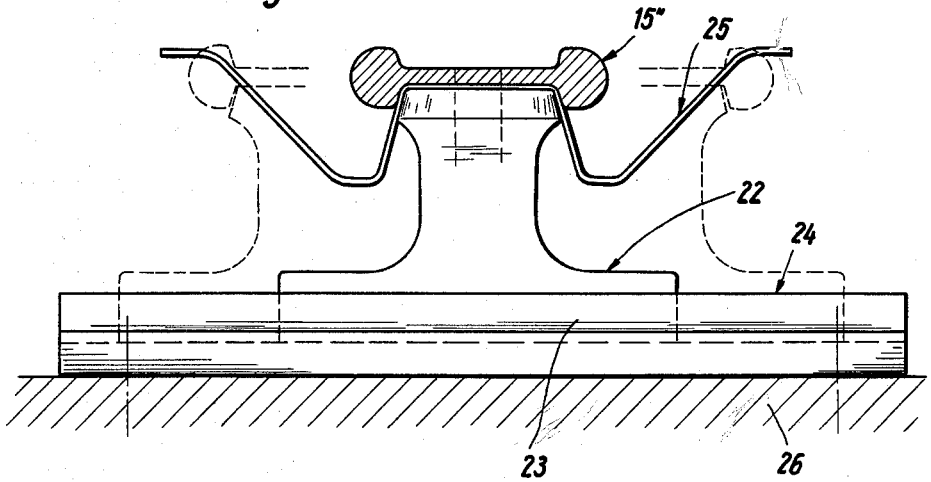
Figure 8:
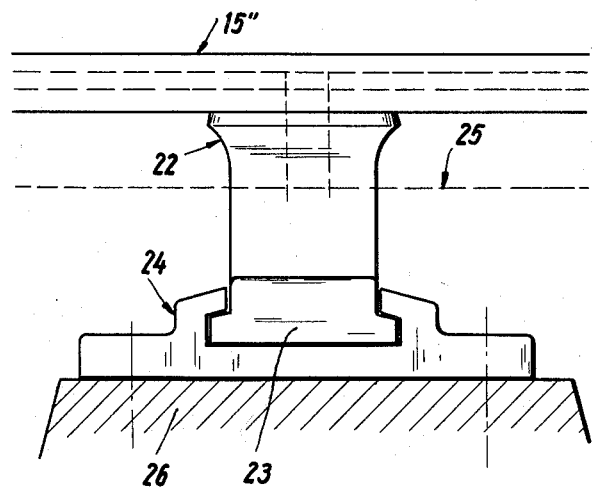

Further advantages and features of the invention will become apparent from the following description with reference to the embodiments illustrated in the drawings in which:

FIG. 1 is a perspective view of one embodiment of a steering arrangement with a part of the vehicle and the guide rail, FIG. 2 is a horizontal section through a vehicle in accordance with the invention where the section is such that the guiding means with the truck of the steering bar and running wheels are visible, FIG. 3 is a side view of a truck or pivot frame taken along line A–B in FIG. 2, FIGS. 4 and 5 are views of two embodiments of the guiding rail with the guide rollers and running wheels taken perpendicularly to the direction of travel, FIG. 6 is a side view of a part of the rail or track arrangement in accordance with FIG. 5, FIG. 7 is a cross section of a switch which is a part of the embodiment in accordance with FIGS. 5 and 6, and FIG. 8 is a side view of FIG. 7.

As shown in FIGS. 1 and 2, the weight of the vehicle 1 is supported on the running wheels 4 by way of pivot frame 2 and axles 3, 3', where the wheels are provided with pneumatic tires that are balanced by springs 5 with respect to the vehicle.

The guiding means are supported on the pivot frames or axles in a manner to provide for vertical tolerance. Thus, it is possible during travel that the vertical movements of the vehicle frame 1', caused by the varying load are not transmitted to the guiding means. For example, each guiding mechanism has a stud 6 which can slide up and down within a bore 8 in a pivot frame or axle and which is provided at its upper end with an expanded abutment 7.

The guide rollers 11 are mounted on lever arms 10 which are pivotally movable on axles 9 that extend in the direction longitudinally of the vehicle. They can be retained in the embodiment illustrated in FIG. 1 in the retaining means indicated at 12. Similar retaining means are, of course, provided for all pairs of rails in order to compensate for unevenness in the path of the guiding rail as well as for dampening out oscillations. It is possible to provide springs or silent blocks (not shown) at the axles 9.

It is, of course, also conceivable to retain the guiding rollers in operative position in a different manner for example, pneumatically, electromagnetically and by means of biasing springs.

The guiding rollers 11 must not necessarily be entirely made of steel. For the purpose of reducing the running noise, they may also be provided with rubber or plastic inlays. In accordance with FIGS. 1, 4 and 5, each of the rollers has a flange 13, which at its bottom side engages the profile of the rail or the head of the rail while its running surface 14 engages the rail 15 from the top. By these means, as well as also by the inclined or acute angular position of the guiding rollers which rise to the plane of the road bed, the rollers hold onto the rail in a manner similar to claws and are maintained there in absolutely non-derailable fashion. Nevertheless, the guide rollers may be pivotably moved and rocked away from the track profile in simplest fashion as indicated by the arrow in FIG. 4. The weight of the vehicle in this connection is absorbed solely by the running wheels 4, which are preferably provided with double or twin tires 4', as indicated so that also in the event of one tire being punctured, the vehicle is supported by the second tire.

Depending on the course of the guide rail, the guiding rollers 11, either move a steering rod 17, by way of a frame 16, or the pivot frame 2 so that the running wheels 4 are adjusted exactly to the required direction. Advantageously, two guide rollers 11 may be disposed opposite from one another without the flanges contacting one another in the operative position. Thus, the guiding frames 16 at one or both ends of the train, as well as the pivot frames 2 can be made as short as possible. Suitably, two pairs of guide rollers are comprised in a single steering unit and are arranged symmetrically with respect to the running wheels (FIG. 2) so that too much or insufficient following of the vehicle to a steering impulse is avoided.

The vehicle in accordance with the invention is intended for constant steering by means of a guide rail 15. However, if it is to be taken out of operation for repairs or the like, it is only necessary to remove the retaining means mentioned above for example, to make springs ineffective and to pivotally move the guide rollers 11 upwardly out of engagement, as indicated by the arrow in FIG. 4.

In accordance with FIG. 3, the pivot frames or stools 2 may have inclined slots 18 for accommodating the axles 3', of the wheels. In this manner it is achieved that the axes 3', of a pivot frame when a vehicle enters or leaves a curve of greater arcuation than normal adjust themselves automatically so that they are directed toward the center of the curvature.

The invention permits the use of very simple commercially available rail profiles. These may be railroad tracks 15 in accordance with FIG. 4 or suspension track profiles 15', 15" as in accordance with FIGS. 5 to 8. The guide rails may either be sunk in a groove 19 (see FIG. 4) or be placed on the surface on standards 20 and concrete bases 26 (FIGS. 5 and 6) and they are preferably exchangeable. For protecting the street surface as well as the lateral borders of the groove 19, the grooves may be lined with sheet metal linings 21 which extend below the profile of the track at a distance therefrom (see FIG. 1).

If the guiding track is sunk in a groove, the openings at the level of the associated running surface may be so small that any transverse traffic is not impeded.

Instead of this, it would also be possible for example, in the bottom surface of a tunnel to place and mount in concrete a special concrete groove which has the mounting screws for the track as well as a sufficient space for drawing up these screws.

As shown in FIGS. 4 and 5, the surface of the guiding track is suitably at the same level as the plane of the road bed indicated in dot and dash lines at 28 or the road bed 29 for the wheels 4, 4'. In this manner, it is possible at side tracks, i.e. switches for the running wheels 4, 4' to travel over the guiding rail which constitutes the support at these places. It is immaterial here whether a track is placed below ground (FIG. 4) or above ground (FIG. 5). It is only essential that the running surfaces 29 be in the plane 28, i.e. at the level of the upper edge of the track.

In this manner, the construction of side tracks or provision of switches is considerably simplified since the switches can be formed as simple point switches. With the arrangement of the guide track in the ground, the surface traffic of other vehicles is likewise not impeded.

The embodiment in accordance with FIGS. 5 and 6 indicates that the tracks can be arranged and constructed in such a manner that the greatest moment of resistance is disposed horizontally. In FIGS. 7 and 8, the appertaining point switch is illustrated. The track section 15" is pivotally mounted on one of the several standards 22 which are displaceable in a guide groove 24 by way of a sliding shoe 23, transversely of the direction of travel. Also, here a lining 25 may be provided which extends below the track profile at a distance.

Having now described our invention with reference to the embodiments illustrated in the drawings, we do not wish to be limited thereto, but what we desire to protect by Letters Patent is set forth in the appended claims.

We claim:

1. Steering means for a self steering vehicle of the type having guide rollers movable along a guide rail and running wheels operatively linked to said guide rollers to follow the course of the guide rail, said means including a guide rail having a head portion presenting a pair of oppositely disposed running surfaces having each an inwardly directed lower portion and an inwardly directed upper portion and guide rollers arranged in pairs and disposed opposite one another and having each a rim surface corresponding to one said running surface, each said rim surface having a portion for engagement with the lower portion of the corresponding running surface and a portion for engagement with the upper portion of the running surface, said inwardly directed lower portion preventing upward movement and said inwardly directed upper portion preventing downward movement of said rollers and frame means extending generally in a horizontal plane including a pivot pin for each said roller extending in said horizontal plane and supporting the associated roller at an acute angle relative to said horizontal plane.

2. Steering means for a self steering vehicle of the type having guide rollers movable along a guide rail and running wheels operatively linked to said guide rollers to follow the course of the guide rail, said means including a guide rail having a head portion presenting a pair of oppositely disposed running surfaces having each an inwardly directed lower portion and an inwardly directed upper portion and guide rollers arranged in pairs and disposed opposite one another and having each a rim surface corresponding to one said running surface, each said rim surface having a portion for engagement with the lower portion of the corresponding running surface and a portion for engagement with the upper portion of the running surface, and frame means extending generally in a horizontal plane including a pivot pin for each said roller extending in said horizontal plane and supporting the associated roller at an acute angle relative to said horizontal plane, and said guide rollers being mounted on axles supported on said pivot pins and means being provided for biasing each said axle and its said roller against said guiding rail, said driving wheels having drive wheel axles supported on said frame and said frame having slots diverging upwardly and being in planes that are substantially vertical and parallel to the guide rail and extending at an acute angle with respect to said horizontal plane through which said drive wheel axles extend and are movable for automatic adjustment relative to the center of curves through which said vehicle travels.

3. Steering means for a self steering vehicle of the type having guide rollers movable along a guide rail and running wheels operatively linked to said guide rollers to follow the course of the guide rail, said means including a guide rail having a head portion presenting a pair of oppositely disposed running surfaces having each an inwardly directed lower portion and an inwardly directed upper portion and guide rollers arranged in pairs and disposed opposite one another and having each a rim surface corresponding to one said running surface, each said rim surface having a portion for engagement with the lower portion of the corresponding running surface and a portion for engagement with the upper portion of the running surface, and frame means extending generally in a horizontal plane including a pivot pin for each said roller extending in said horizontal plane and supporting the associated roller at an acute angle relative to said horizontal plane, said vehicle having a vehicle frame including means for pivotally supporting the running wheels and linking means operatively connecting said rollers to said running wheels.

4. Steering means for a self steering vehicle of the type having guide rollers movable along a guide rail and running wheels operatively linked to said guide rollers to follow the course of the guide rail, said means including a guide rail having a head portion presenting a pair of oppositely disposed running surfaces having each an inwardly directed lower portion and an inwardly directed upper portion and guide rollers arranged in pairs and disposed opposite one another and having each a rim surface corresponding to one said running surface, each said rim surface having a portion for engagement with the lower portion of the corresponding running surface and a portion for engagement with the upper portion of the running surface, and frame means extending generally in a horizontal plane including a pivot pin for each said roller extending in said horizontal plane and supporting the associated roller at an acute angle relative to said horizontal plane, said guide rollers being mounted on axles supported on said pivot pins and means being provided for biasing each said axle and its said roller against said guiding rail.

5. Steering means for a self steering vehicle of the type having guide rollers movable along a guide rail and running wheels operatively linked to said guide rollers to follow the course of the guide rail, said means including a guide rail having a head portion presenting a pair of oppositely disposed running surfaces having each an inwardly directed lower portion and an inwardly directed upper portion and guide rollers arranged in pairs and disposed opposite one another and having each a rim surface corresponding to one said running surface, each said rim surface having a portion for engagement with the lower portion of the corresponding running surface and a portion for engagement with the upper portion of the running surface, and frame means extending generally in a horizontal plane including a pivot pin for each said roller extending in said horizontal plane and supporting the associated roller at an acute angle relative to said horizontal plane, the upper edge of said guide rail being disposed in a plane with the running surface on which said drive wheels are supported.

6. Steering means for a self steering vehicle of the type having guide rollers movable along a guide rail and running wheels operatively linked to said guide rollers to follow the course of the guide rail, said means including a guide rail having a head portion presenting a pair of oppositely disposed running surfaces having each an inwardly directed lower portion and an inwardly directed upper portion and guide rollers arranged in pairs and disposed opposite one another and having each a rim surface corresponding to one said running surface, each said rim surface having a portion for engagement with the lower portion of the corresponding running surface and a portion for engagement with the upper portion of the running surface, and frame means extending generally in a horizontal plane including a pivot pin for each said roller extending in said horizontal plane and supporting the associated roller at an acute angle relative to said horizontal plane, the upper edge of said guide rail being disposed in a plane with the running surface on which said drive wheels are supported, and means defining a groove open at the top and disposed around said guide rail and spaced therefrom to accommodate said guide rollers adjacent said guide rail.

7. The means in accordance with claim 6 wherein said groove is provided with a protective lining extending below the head portion of said track.

8. A self steering vehicle of the type having guide rollers movable along a guide rail having a head portion presenting a pair of oppositely disposed running surfaces having each an inwardly directed lower portion and an inwardly directed upper portion, said vehicle having running wheels and guide rollers arranged in pairs and disposed opposite one another and linked to said running wheels, each said guide roller having a rim surface presenting a lower portion for engagement with the lower portion of the running surface of the guide rail and an upper portion for engagement with the upper portion of the running surface of the guide rail, said running wheels and said guide rollers being mounted on a frame providing pivot support for said rollers and extending generally in a horizontal plane between said running wheels, and said guide rollers being each disposed at an acute angle relative to said horizontal plane, said lower portions and said upper portions of said running surfaces of said guide rail being disposed at an angle relative to one another.

9. A self steering vehicle of the type having guide rollers movable along a guide rail having oppositely disposed running surfaces, said vehicle having running wheels and guide rollers arranged in pairs and disposed opposite one another and linked to said running wheels, each said guide roller having a rim surface presenting a lower portion for engagement with the lower portion of the running surface of the guide rail and an upper portion for engagement with the upper portion of the running surface of the guide rail, said running wheels and said guide rollers being mounted on a frame providing pivot support for said rollers and extending generally in a horizontal plane between said running wheels, and said guide rollers being each disposed at an acute angle relative to said horizontal plane, said lower portion and said upper portion of the running surfaces of said guide rail being disposed at an angle relative to one another, and said frame having a pivot pin for each said roller extending with its axis in the direction of travel and supporting the associated roller for pivotal movement about said pivot pin, and said guide rollers being mounted on axles supported on respective pivot pins and means being provided for biasing each said axle and its roller in the direction of an associated oppositely disposed roller.

10. Steering means for a self steering vehicle of the type having guide rollers movable along a guide rail and running wheels operatively linked to said guide rollers to follow the course of the guide rail, said means including a guide rail having a head portion presenting a pair of oppositely disposed running surfaces having each an inwardly directed lower portion and an inwardly directed upper portion and guide rollers arranged in pairs and disposed opposite one another and having each a rim surface corresponding to one said running surface, each said rim surface having a portion for engagement with the lower portion of the corresponding running surface and a portion for engagement with the upper portion of the running surface, said running wheels and said guide rollers being mounted on frame means providing pivot support for said rollers and extending generally in a horizontal plane between said running wheels, said guide rollers being each disposed at an acute angle relative to said horizontal plane and said frame means having a pivot pin for each said roller extending with its axis in the direction of travel and supporting the associated roller for pivotal movement about the pivot axis, and each pair of said rollers constituting a steering unit and being disposed symmetrically with respect to the associated running wheels on said frame, and said rollers and running wheels being operatively connected to each other by way of said frame.

References Cited by the Examiner

UNITED STATES PATENTS

| 554,644 | 2/96 | Belk | 104—244 |
| 867,765 | 10/07 | Strickler | 104—246 |
| 927,517 | 7/09 | Fageol | 104—245 X |

FOREIGN PATENTS

| 4,352 | 3/89 | Great Britain. |

MILTON BUCHLER, *Primary Examiner.*

LEO QUACKENBUSH, *Examiner.*